(12) United States Patent
Xi

(10) Patent No.: US 11,356,547 B2
(45) Date of Patent: Jun. 7, 2022

(54) BACKGROUND DISPLAY METHOD AND APPARATUS DURING CALL, AND STORAGE MEDIUM

(71) Applicant: BEIJING XIAOMI MOBILE SOFTWARE CO., LTD., Beijing (CN)

(72) Inventor: Chunyan Xi, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 14 days.

(21) Appl. No.: 17/019,224

(22) Filed: Sep. 12, 2020

(65) Prior Publication Data

US 2021/0314435 A1 Oct. 7, 2021

(30) Foreign Application Priority Data

Apr. 2, 2020 (CN) .......................... 202010256399.5

(51) Int. Cl.
*H04M 1/72448* (2021.01)
*G06F 3/14* (2006.01)
*G06T 11/00* (2006.01)
*H04M 19/04* (2006.01)

(52) U.S. Cl.
CPC .......... *H04M 1/72448* (2021.01); *G06F 3/14* (2013.01); *G06T 11/001* (2013.01); *H04M 19/042* (2013.01)

(58) Field of Classification Search
CPC ........................ H04M 19/042; H04M 1/72484
See application file for complete search history.

(56) References Cited

U.S. PATENT DOCUMENTS

| | | | |
|---|---|---|---|
| 6,754,313 B1* | 6/2004 | Quinton | H04M 1/2473 379/90.01 |
| 2005/0122333 A1* | 6/2005 | Sumanaweera | G06T 17/20 345/502 |
| 2006/0073817 A1 | 4/2006 | Lee | |
| 2013/0230179 A1* | 9/2013 | Beaty | H04S 7/40 381/56 |
| 2014/0292768 A1* | 10/2014 | Tobin | G06T 13/80 345/473 |
| 2016/0260149 A1* | 9/2016 | Clark | G06Q 30/0621 |
| 2016/0364029 A1* | 12/2016 | Miller | B60K 35/00 |

FOREIGN PATENT DOCUMENTS

| | | |
|---|---|---|
| CN | 103927175 A | 7/2014 |
| CN | 105516481 A | 4/2016 |
| EP | 1033857 A2 | 9/2000 |
| KR | 20050022218 A | 3/2005 |
| KR | 20070010616 A | 1/2007 |

OTHER PUBLICATIONS

Search report for EP application 20198299.8, dated Mar. 25, 2021.
First OA for CN application 202010256399.5, dated Nov. 4, 2020.

* cited by examiner

*Primary Examiner* — Phi Hoang
(74) *Attorney, Agent, or Firm* — Syncoda LLC; Feng Ma

(57) ABSTRACT

A background display method during a call includes: obtaining information on the call; and dynamically displaying a background image on a call interface based on the information.

14 Claims, 4 Drawing Sheets

```
┌─────────────────────────────────────────┐
│                                         │   ╭─ S11
│   obtaining information on the call     │ ──┤
│                                         │   ╰─
└─────────────────────────────────────────┘
                    │
                    ▼
┌─────────────────────────────────────────┐
│                                         │   ╭─ S12
│ dynamically displaying a background     │ ──┤
│ image on a call interface based on the  │   ╰─
│ information                             │
└─────────────────────────────────────────┘
```

BACKGROUND DISPLAY METHOD AND APPARATUS DURING CALL, AND STORAGE MEDIUM

CROSS-REFERENCE TO RELATED APPLICATION

The present application claims priority to Chinese Patent Application No. 202010256399.5 filed on Apr. 2, 2020, the disclosure of which is hereby incorporated by reference in its entirety.

BACKGROUND

When making a call or receiving a call through a mobile terminal, a custom background image or background icon can be displayed on a call interface based on the preference of a user, or the background image or background icon of the call can be further processed for static effects, thereby optimizing the user's experience of making calls with the mobile terminal.

SUMMARY

The present disclosure relates generally to a field of dynamic image generation, and more specifically to a background display method and apparatus during a call, and a storage medium.

Various embodiments of the present disclosure provide background display methods and apparatuses during a call, and storage media.

Embodiments of the present disclosure provide a background display method during a call, which is applied to a terminal. The method includes obtaining information on the call and dynamically displaying a background image on a call interface based on the information.

Embodiments of the present disclosure provide a background display apparatus during a call, which is applied to a terminal. The apparatus includes an obtaining module, configured to obtain information on the call; and a display module, configured to dynamically display a background image on a call interface based on the information.

A fourth aspect of embodiments of the present disclosure provides a non-transitory computer-readable storage medium. When an instruction in the storage medium is executed by a processor of a mobile terminal, the mobile terminal is configured to perform a background display method during a call. The method includes obtaining information on the call and dynamically displaying a background image on a call interface based on the information.

It should be understood that the above general description and the following detailed description are only exemplary and explanatory, and do not limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Displaying static background images on the call interface can be too monotonous. Various embodiments of the present disclosure can provide dynamic background for a call interface.

Figure 1:
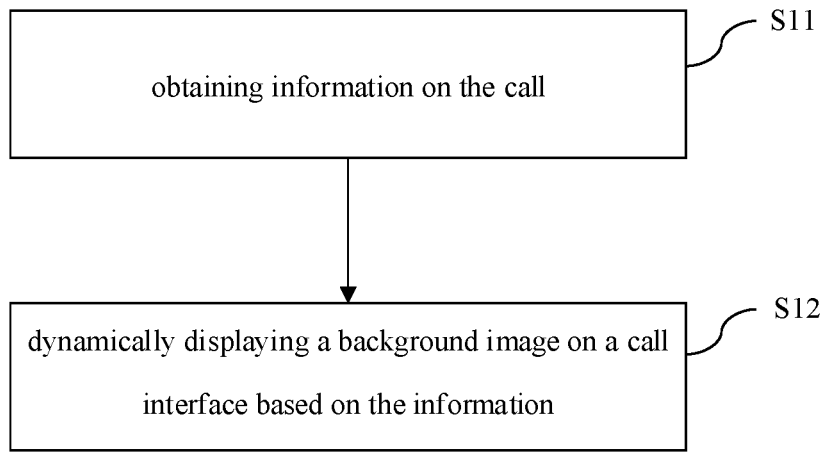
FIG. 1 is a flowchart of a background display method during a call according to some embodiments.

FIG. 1 is a flowchart of a method for generating a dynamic background during a call according to some embodiments. As illustrated in FIG. 1, a background display method during a call is applied to a terminal. The method includes the following steps.

At block S11, information on the call is obtained.

In some embodiments of the present disclosure, the information on the call obtained by the terminal may be information involved in communicating with another terminal and establishing a voice call, such as caller ID information, caller ringtone information, a ringing duration of the ringtone or vibrating, and a duration of the call. Generally speaking, in a device with Android system, a framework layer of the Android system is responsible for the management of a communication module. A system layer may enable a request initiated by an upper layer application to interact with a modem downwardly through a radio interface layer (RIL), and may also handle information such as a network status reported by a network layer and a current status of a call. When the framework layer receives a call request from another user, that is, the information on the call, the information on the call will be sent to an application layer of a phone module of the system. At this time, the application layer obtains the information on the call of another user.

Generally speaking, the application layer of the phone module may be Dialer software configured by default in the Android system. In some embodiments of the present disclosure, the application layer of the phone module is a calling application issued by a third-party application software operator.

Obtaining the information also includes obtaining a call ringtone and/or obtaining a call duration. The information is obtained based on custom settings of the user or application settings. For example, the information may be data information related to the call ringtone, or may be the duration of the call.

At block S12, a background image is dynamically displayed on a call interface based on the information.

In some embodiments of the present disclosure, different changing effects of the background image may be displayed on the call interface based on different information.

In an embodiment, for example, the information includes a ringtone, and different dynamic effects of the background image may be presented based on the ringtone. For example, a dynamically changing background image matching a ringtone level of the call ringtone is displayed on the call interface based on a correspondence between the ringtone level and a dynamically changing effect of the background image.

A dynamically changing background image matching the call duration is displayed on the call interface based on a correspondence between the call duration and a dynamically changing effect of the background image.

Different states of the same information may correspond to different changing effects of different background images. For example, when the call ringtone is loud, a flow range is large, and a dynamic fluctuation effect of the background image is obvious. When the call ringtone is low, the flow range is small, and the dynamic fluctuation effect of the background image is relatively insignificant.

Figure 2:
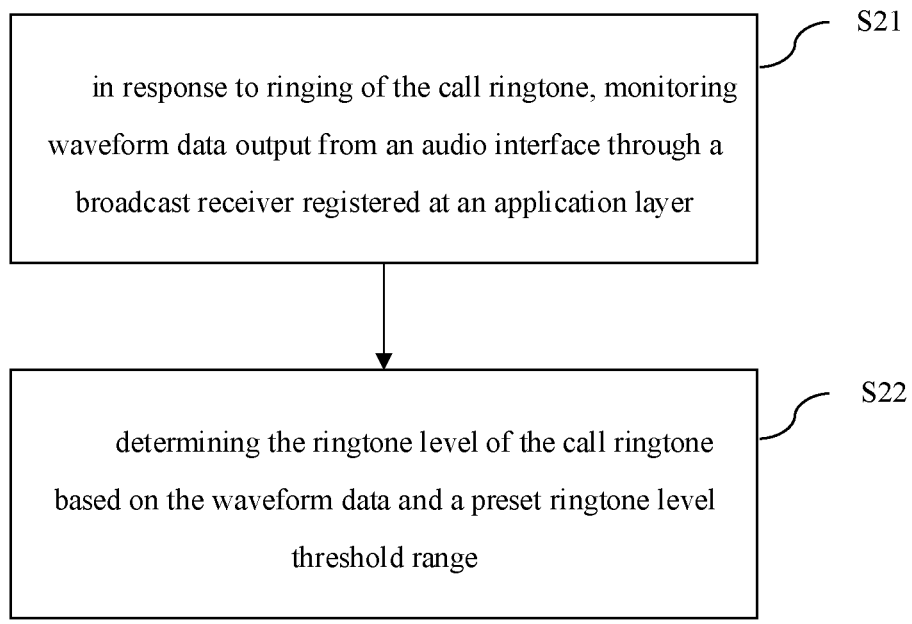
FIG. 2 is a flowchart of displaying a dynamic effect of a background of a background display method during a call according to some embodiments.

FIG. 2 is a flowchart of displaying a dynamic effect of a background of a background display method during a call according to some embodiments. As illustrated in FIG. 2, a process of displaying the dynamic effect of the background is as follows, and includes the following steps.

At block S21, in response to ringing of the call ringtone, waveform data output from an audio interface is monitored through a broadcast receiver registered at an application layer.

In some embodiments of the present disclosure, the broadcast receiver may be registered at the application layer of the terminal to monitor broadcast data, for example, to monitor ACTION_RING_WAVE broadcast. In response to the ringing of the call ringtone, the waveform data output from the audio interface is monitored through the broadcast receiver registered at the application layer.

In some embodiments of the present disclosure, the broadcast data may be obtained every fixed period of time from the ringing of the call ringtone.

After obtaining the broadcast data, the broadcast data is transferred to the application layer through the broadcast ACTION_RING_WAVE.

In some embodiments of the present disclosure, 1 second is selected as a cycle of obtaining the broadcast data. After the ringtone starts to sound and the broadcast receiver monitors the broadcast data, the broadcast data is obtained every 1 second. Of course, other time intervals may be selected to obtain the broadcast data, as long as the broadcast data is sufficient for rendering of the dynamic image, and the effect that the image changes dynamically with the fluctuation of the broadcast data may be produced.

In some embodiments of the present disclosure, once the broadcast receiver receives the broadcast of the ringtone, the broadcast receiver will obtain the broadcast data at a fixed time interval. The broadcast data obtained at the fixed time interval contain the waveform information of the ringtone. Therefore, the application layer will obtain this set of waveform data and record the data information.

At block S22, the ringtone level of the call ringtone is determined based on the waveform data and a preset ringtone level threshold range.

In an embodiment of the present disclosure, after the waveform data is obtained, the application layer obtains an average value and a peak value of a waveform at different periods of time from the waveform data, and calculates a peak-to-average ratio of the waveform. The range of the ratio is from 0.0 to 1.0 fluency, that is, data of the peak-to-average ratio may be normalized, such that a value of the ratio may be limited to a range of 0~1. The application layer sets several thresholds between 0.0 and 1.0 fluency, and compares the peak-to-average ratio of the waveform with the thresholds to determine the ringtone level, that is, a level of the waveform data extracted from the ringtone data.

In some embodiments of the present disclosure, the correspondence between the ringtone level and the dynamically changing effect of the background image is set. After the ringtone level is determined, the dynamically changing background image matching the ringtone level of the call ringtone is displayed on the call interface based on the correspondence between the ringtone level and the dynamically changing effect of the background image.

In some embodiments of the present disclosure, the information may further include the call duration. When the background image is dynamically displayed on the call interface, the dynamically changing background image matching the call duration is displayed on the call interface based on the correspondence between the call duration and the dynamically changing effect of the background image.

The dynamically changing effect of the background image may also be understood as being reflected by a degree of image rendering. Based on the dynamically changing effect of different background images, the degree to which the image is rendered is also different. For example, when the ringtone is loud, a corresponding waveform level corresponds to an obvious dynamic fluctuation effect of a rendered image; and when the ringtone is low, a corresponding waveform level corresponds to a weak dynamic fluctuation effect of the rendered image.

In some embodiments of the present disclosure, in order to display background images with different dynamic effects corresponding to different ringtone levels and/or call durations, the ringtone levels and/or call durations may be converted into rendering parameters when the background images are rendered, and the background images with different dynamically changing effects may be rendered based on the rendering parameters.

In some embodiments of the present disclosure, an open graphics library (OpenGL) is used to render the background image, so as to realize rendering of the dynamic display of the background image through software, without adding any hardware cost. In addition, only the application layer of the terminal is involved, and thus the cost is very low as it is unnecessary to make any modification on a bottom side.

OpenGL defines a professional programming graphics program interface cross a programming language and a platform, it may be used for processing and rendering of 2D or 3D images, and is a powerful and convenient bottom graphics library. For graphics and image processing on mobile devices, OpenGL provides a version of OpenGL for embedded systems (OpenGL ES) for embedded devices. This version is designed for embedded devices such as mobile phones and Pads, and is a subset of OpenGL. OpenGL shading language (GLSL) is a shader language of OpenGL. Developers use this language to write programs to be run on the graphic processing unit (GPU, which may be understood as a highly concurrent operator) to perform image processing and rendering. Codes of the GLSL shader are divided into two parts, namely Vertex Shader and Fragment Shader, which respectively complete their respective functions in the OpenGL rendering pipeline.

OpenGL may be regarded as the most efficient tool to use the GPU so far. The GPU may perform floating-point operations in parallel. Consequently, the GPU may be used to share the work of the CPU, thereby improving work efficiency, and shortening a development cycle.

Figure 3:
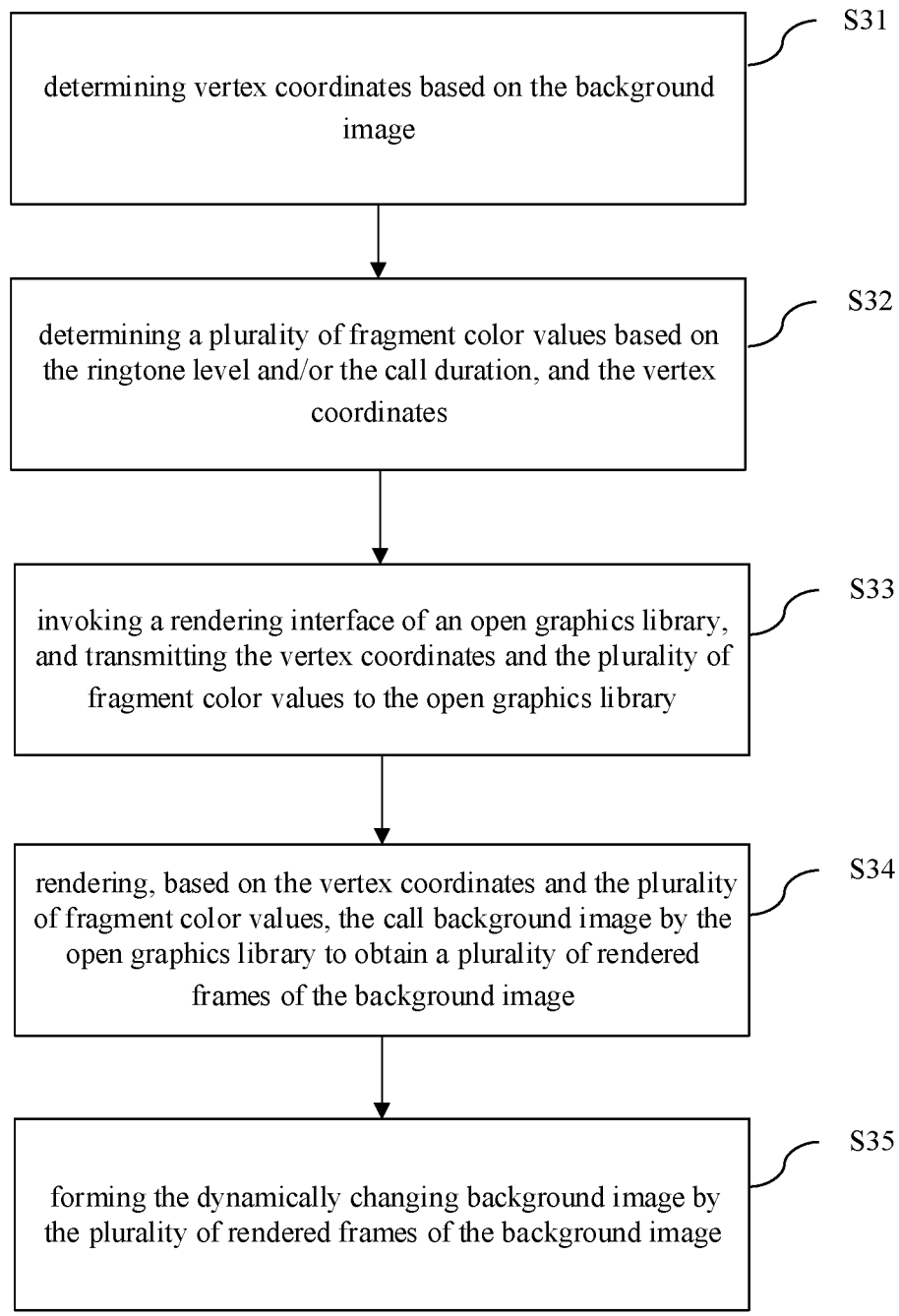
FIG. 3 is a flowchart of a rendering method of a background image of a background display method during a call according to some embodiments.

In some embodiments of the present disclosure, in order to realize the rendering of the dynamic display effect of the background image through OpenGL, the dynamic display effect of the background image may be rendered in a method illustrated in FIG. 3. As illustrated in FIG. 3, the method includes the following steps.

At block S31, vertex coordinates are determined based on the background image.

At block S32, a plurality of fragment color values are determined based on the ringtone level and/or the call duration, and the vertex coordinates.

At block S33, a rendering interface of an OpenGL is invoked, and the vertex coordinates and the plurality of fragment color values are transmitted to the OpenGL.

At block S34, the OpenGL renders, based on the vertex coordinates and the plurality of fragment color values, the call background image to obtain a plurality of rendered frames of the background image.

At block S35, the dynamically changing background image is formed through the plurality of rendered frames of the background image.

The rendering process of the dynamic display effect of the background image performed by OpenGL according to some embodiments will be described in combination with an actual application.

First, the version of OpenGL that will be used during rendering is declared.

In some embodiments of the present disclosure, the version of OpenGL that may be used is OpenGL ES 2.0 or OpenGL ES 3.0. In an actual operation process, the version number declared may be written to the Activity Manifest file for the purpose of invoking.

Second, an original background image is selected.

In this embodiment, the background image may be obtained from an instruction of the user, that is, the user may specify an original image of the dynamic background that the user wants to display; or, randomly select a suitable image as the original background image from a collection of the user or an image folder of the local device; or, extract an image from a lock screen interface of the mobile device as the original background image.

Third, a renderer interface of OpenGL is invoked to render frames of the background image.

It should be noted that there are two basic classes in an Android framework: GLSurfaceView and GLSurfaceView.Renderer. The two basic classes may invoke an application programming interface (API) in OpenGL for Embedded Systems (OpenGL ES; the OpenGL system for embedded devices is designed for mobile devices such as mobile phones and pads, and is a subset of OpenGL) to create and operate images. GLSurfaceView is used to display a rendered image, and GLSurfaceView.Renderer may be used to generate a renderer to complete the rendering operation of the image.

When the application completes the preceding steps and requests the system to render the background image, the application informs the system to invoke GLSurfaceView.Renderer.

In some embodiments of the present disclosure, using GLSurfaceView.Renderer to invoke the renderer interface of OpenGL so as to render the frames of the background image further includes setting environment parameters of OpenGL or initializing a graphic object of OpenGL.

All the images in OpenGL ES are displayed on the screen. Color and texture are a two-dimensional array of image data in a 2D image. Generally speaking, OpenGL may render an ordinary 2D image and generate a three-dimensional image (the dynamic image in some embodiments) through steps such as reading vertex data, executing a vertex shader, assembling primitives, rasterizing the primitives, and executing a fragment shader.

In this process, the system will first invoke onSurfaceCreated method to initialize OpenGL, and then, invoke onSurfaceChanged method to set a size of a canvas, and finally invoke onDrawFrame during a rendering process of each frame. The above completes the initialization of the environment parameters of OpenGL and the initialization of the graphic object of OpenGL.

In some embodiments of the present disclosure, OpenGL determines pixels of an area to be rendered based on the vertex coordinates and the fragment color values, and colors individual pixels by the fragment color values. Each frame is drawn through onDrawFrame (GL10 gl) in GLSurfaceView.Renderer. onDrawFrame will be invoked when drawing each frame, and the rendering of each frame will be completed here.

In some embodiments of the present disclosure, when OpenGL renders the dynamic effect of the background image based on the vertex coordinates and the fragment color values, the following method may be adopted.

The vertex coordinates and texture coordinates may be obtained.

In this process, the vertex coordinates may be specified by the user in the program, or may be obtained by reading vertex attribute data in an image. The system transmits the collected vertex attribute data to a GPU, which is processed by the vertex shader. The vertex coordinates include a color value and texture attributes of each pixel in the image.

In some embodiments of the present disclosure, a background image is divided into 6 rectangles on average, and four vertexes of the rectangle are determined as points in the area to calculate the color values. Each pixel value in the rectangle will change based on the seed, so that the fragment color values obtained are different. The image rendered by OpenGL is different. What the user sees is a dynamically changing image composed of different values. A feeling of flow may be felt by the user by repeating the rendering process. Regarding the color extraction method, the color values of the entire image may be sorted, and the color values are extracted and calculated based on an area where the color values concentrate.

The application layer of the terminal according to some embodiments of the present disclosure transmits gl_Position, the vertex coordinates, to OpenGL. In some embodiments of the present disclosure, all coordinates of the background image displayed on a background interface may be transmitted to OpenGL.

gl_Position represents the vertex coordinates, and built-in variables of vec4 gl_Position represent vertex coordinates to be finally transmitted to the fragment shader for fragmentation. The vertex coordinates gl_Position may be expressed in the following form:

| | private float[ ] mVertexCoordinateArray = { | |
|---|---|---|
| i. | | +1.0f, +1.0f, |
| ii. | | −1.0f, +1.0f, |
| iii. | | −1.0f, −1.0f, |
| iv. | | +1.0f, +1.0f, |
| v. | | −1.0f, −1.0f, |

| | |
|---|---|
| vi. | +1.0f, −1.0f, |
| b. | }; |

The vertex shader and fragment shader are loaded and compiled.

After the vertex shader and the fragment shader are loaded to a program of OpenGL through compilation, the shader may process the vertex data and render the background image. Loading and compiling the vertex shader needs to obtain and enable a member handle of vPosition. Loading and compiling the fragment shader needs to obtain and enable a member handle of aTexCoord.

Objects are created, vertexes are connected, objects are linked, and coordinate colors are confirmed.

The vertex shader is used to perform matrix transformation on the vertex data to obtain positions, to calculate a lighting formula and generate color data of the vertexes, or to generate or change the texture coordinates based on the vertex data, and to send the positions and texture coordinate parameters to the fragment shader.

The fragment shader is used to calculate the color and other attributes of each pixel. In detail, the fragment shader is used to calculate the color of each pixel by adopting processing methods such as light values, bump maps, shadows, specular highlights, and translucency. The depth value of the pixel is changed. Different colors are outputted when a plurality of targets to be rendered are activated. Or, each fragment generated by a rasterization stage is processed to finally calculate a color value of each pixel. The color value described here includes color components, a pixel transparency value, fog parameters, texture parameters, and the like of each pixel in the image.

The vertex shader and the fragment shader may communicate by transmitting variables. Each image in a dynamic background video may be drawn with the two shaders.

When drawing each frame of the background image, OpenGL extracts the colors and textures of pixels from the vertex coordinates and calculates a new texture mapping based on blurring parameters and/or time parameters set by the program. In some embodiments of the present disclosure, the blurring parameters are generated by a waveform level of the call ringtone. Of course, the blurring parameters may also be a set of values generated by the system that dynamically change based on a certain rule, or random values automatically generated by the system.

In some embodiments of the present disclosure, the application layer of the terminal transmits the fragment color values to OpenGL. The user then performs pixel operations. OpenGL uses the fragment color values to color individual pixel color values, and then displays the values on the background interface.

In some embodiments of the present disclosure, the fragment color values are determined based on the texture coordinates, the background image, the time parameters, the ringtone level, and whether the fragment is blurred. The background image may be selected from the lock screen, the collection of the user, or specified by the user. The time parameters start time based on the call. The ringtone level refers to the calculation of the ringtone level. Regarding if the fragment is blurred, transmit yes. The texture coordinates may be expressed as follows:

| | |
|---|---|
| private float[ ] mTextureCoordinateArray = { | |
| i. | 1.0f, 1.0f, |
| ii. | 0.0f, 1.0f, |
| iii. | 0.0f, 0.0f, |
| iv. | 1.0f, 1.0f, |
| v. | 0.0f, 0.0f, |
| vi. | 1.0f, 0.0f |
| b. | }; |

GLES20.glGetAttribLocation(mProgram, "aTexCoord");

In some embodiments of the present disclosure, gl_FragColor represents a fragment color value, and vec4 gl_FragColor represents a color to be filled in an image. Built-in variables of gl_FragColor are mainly used to set a color of a fragment pixel, and appear in a main function of a fragment shader language.

In a built-in variable of gl_FragColor, a four-dimensional vector vec4(r,g,b,a), the first three parameters represent the color values RGB of a fragment pixel, and the fourth parameter represents transparency A of the fragment pixel, where a value of 1.0 means opaque and 0.0 means completely transparent.

After the vertexes are fragmentized by the fragment shader, individual fragments (or pixels) are obtained, and then a color value is set for each fragment through the built-in variable gl_FragColor. All fragments may or may not use the same color value, which may be calculated by a specific algorithm or sampled through texels (texture pixels).

In some embodiments of the present disclosure, the dynamic effect of the background image may be realized by changing the value of gl_FragColor. It may be understood as that in some embodiments of the present disclosure, the plurality of fragment color values are determined based on the ringtone level and/or the call duration determined based on the information and the background image and the vertex coordinates, thereby dynamically changing the fragment color values. It may also be understood as that the fragment color values will change as the ringtone level and the time parameters change.

In some embodiments of the present disclosure, a transformation of the plurality of fragment color values may be called a seed. In addition, the background image may be enhanced by, for example, adding distortion and randomly processes.

A dynamic background video is generated.

After completing the rendering of each frame of image, the system uses an image sequence to generate the dynamic background video.

The dynamic background video generated through OpenGL is displayed.

After completing the aforementioned steps and requesting to display the dynamic background video generated by OpenGL, the application notifies the system to invoke GLSurfaceView.

GLSurfaceView will further render the dynamic background video generated after rendering of OpenGL and display the video in the application interface. The rendering is performed in a specific area, which is also called a window. After GLSurfaceView creates the window, the dynamic background video obtained through GLSurfaceView.Renderer may be selectively displayed.

In order to prevent unnecessary memory occupation, according to some embodiments of the present disclosure, a life cycle of the dynamic background video is established based on a life cycle of invoking the calling application.

Usually, the life cycle of the calling application includes the activity, suspension, end and destruction of the call. The life cycle of the dynamic background video is established and made to be consistent with the life cycle of the calling application so as to accurately control the display and hiding of the dynamic background video, while prevent unnecessary memory occupation.

Further, based on the information, when the background image is dynamically displayed on the call interface, one or more of the position, color, brightness, saturation, contrast, and sharpness of the background image may be changed based on the call duration.

In some embodiments of the present disclosure, the information is obtained, and the dynamic effect of the background image is displayed based on the information, such that the dynamic display of the background image is realized on the call interface.

Based on the same concept, embodiments of the present disclosure also provide a background display apparatus during a call.

It may be understood that the background display apparatus during the call according to embodiments of the present disclosure include a hardware structure and/or a software module corresponding to performing each function. Exemplary units and algorithm steps described in combination with embodiments disclosed herein may be implemented by hardware, or by a combination of computer software and hardware. Whether certain function is executed by hardware or driving hardware by computer software is dependent on particular use and design constraints of the technical solutions. Professionals may adopt different methods for different particular uses to implement described functions, which should not be regarded as going beyond the scope of the technical solution of embodiments of the present disclosure.

Figure 4:
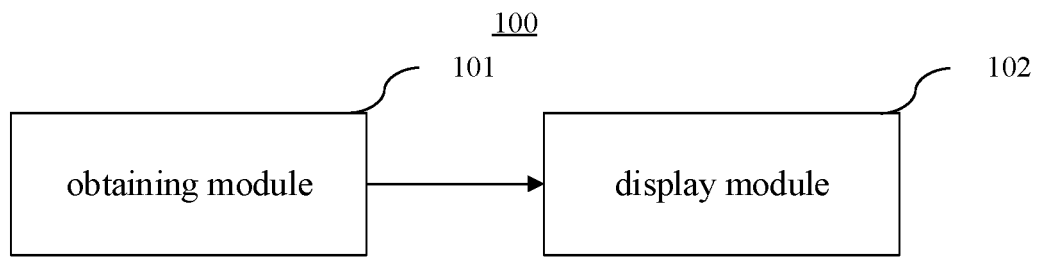
FIG. 4 is a block diagram of a background display apparatus during a call according to some embodiments.

FIG. 4 is a block diagram of a background display apparatus during a call according to some embodiments. With reference to FIG. 4, the apparatus 100 includes an obtaining module 101 and a display module 102.

The obtaining module 101 is configured to obtain information on the call. The display module 102 is configured to dynamically display a background image on a call interface based on the information.

In an embodiment, the information on the call obtained by the obtaining module 101 includes a call ringtone. The display module 102 displays a dynamically changing background image matching a ringtone level of the call ringtone on the call interface based on a correspondence between the ringtone level and a dynamically changing effect of the background image.

The display module 102 is configured to: in response to ringing of the call ringtone, monitor waveform data output from an audio interface through a broadcast receiver registered at an application layer; and determine the ringtone level of the call ringtone based on the waveform data and a preset ringtone level threshold range.

In an embodiment, the information obtained by the obtaining module 101 includes a call duration. The display module 102 displays a dynamically changing background image matching the call duration on the call interface based on a correspondence between the call duration and a dynamically changing effect of the background image.

The display module 102 displays the dynamically changing background image matching the ringtone level of the call ringtone on the call interface in a manner of: determining vertex coordinates based on the background image; determining a plurality of fragment color values based on the ringtone level and/or the call duration, and the vertex coordinates; and invoking a rendering interface of an open graphics library, and transmitting the vertex coordinates and the plurality of fragment color values to the open graphics library, such that the open graphics library renders, based on the vertex coordinates and the plurality of fragment color values, the call background image to obtain a plurality of rendered frames of the background image, and the plurality of rendered frames of the background image form the dynamically changing background image.

Regarding the apparatus in the foregoing embodiments, specific implementations for each module to perform operations have been described in detail in embodiments of the method, and thus no repeated description will be made here.

Figure 5:
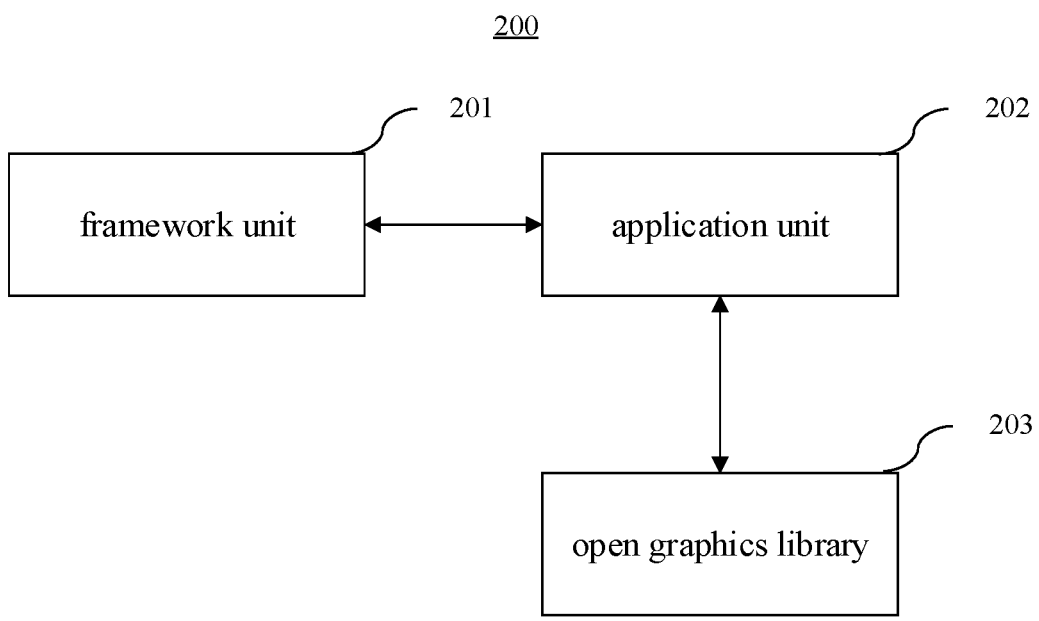
FIG. 5 is a block diagram of a background display system during a call according to some embodiments.

FIG. 5 is a block diagram of a background display system during a call according to some embodiments. With reference to FIG. 5, the system 200 includes a framework unit 201, an application unit 202 and an open graphics library 203.

The framework unit 201 is configured to obtain information on the call. In detail, the framework unit is configured to obtain a ringtone and/or a call duration. The application unit 202 is configured to transmit the information obtained by the framework unit to the open graphics library, and to receive and display a dynamic background video generated by the open graphics library.

The application unit 202 is configured to invoke a registered broadcast receiver of the framework unit to monitor broadcast; and after identifying the information, obtaining broadcast data at regular intervals from the ringing of the ringtone. In detail, the step of receiving and displaying the dynamic background video generated by the open graphics library by the application unit includes: obtaining a set of waveform data based on the broadcast data; assigning data levels to the set of waveform data; setting a correspondence rule between the data levels and image rendering levels; and invoking, based on the correspondence rule, the open graphics library to render the background image. When the application unit is used for image rendering, operations performed are: declaring a version of the open graphics library to be used in a rendering process; selecting the background image; invoking a renderer interface of the open graphics library to render a dynamic background frame; displaying the dynamic background video generated through the open graphics library; and establishing a life cycle of the dynamic background video based on a life cycle of a calling application being invoked.

The application unit 202 is configured to invoke the open graphics library, and to change one or more of the position, color, brightness, saturation, contrast, and sharpness of the background image based on the call duration.

The open graphics library 203 is configured to receive the information obtained by the framework unit and transmitted by the application unit, and to generate the dynamic background video.

In detail, the open graphics library 203 renders the background image by: setting environment parameters of the open graphics library or initializing a graphic object of the open graphics library; loading and compiling a vertex shader and a fragment shader; determining vertex coordinates and texture coordinates of a graphic to be drawn; creating objects, connecting vertexes, linking objects, and confirming coordinate colors; and generating the dynamic background video.

Figure 6:
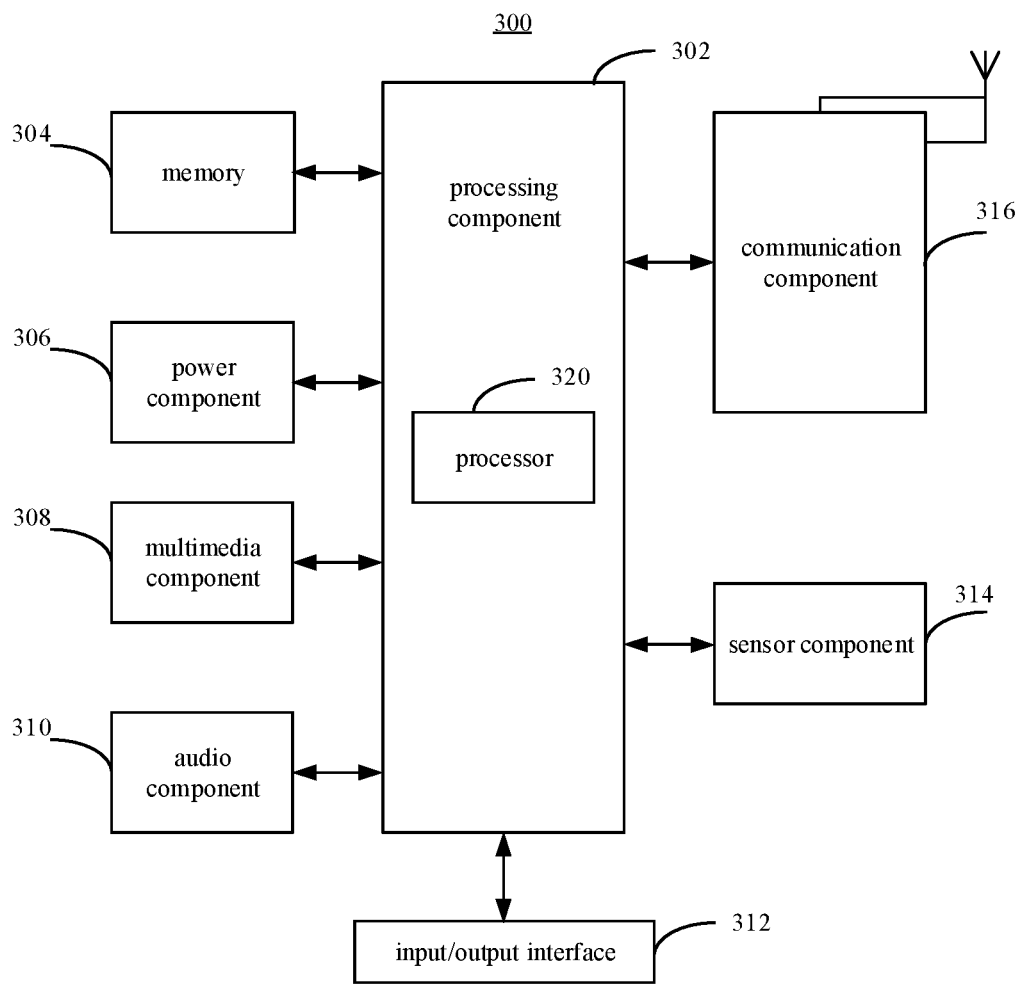
FIG. 6 is a block diagram of a mobile terminal device of a background display apparatus during a call according to some embodiments.

FIG. 6 is a block diagram of a generation device 300 of a dynamic background image for a call according to some embodiments. For example, the device 300 may be a mobile phone or other communicable devices having a display function.

Referring to FIG. 6, the device 300 may include one or more of the following components: a processing component 302, a memory 304, a power component 306, a multimedia component 308, an audio component 310, an input/output (I/O) interface 312, a sensor component 314, and a communication component 316.

The processing component 302 normally controls the overall operation (such as operations associated with displaying, telephone calls, data communications, camera operations and recording operations) of the device 300. The processing component 302 may include one or a plurality of processors 320 to execute instructions so as to perform all or part of the steps of the above described method. In addition, the processing component 302 may include one or a plurality of units to facilitate interactions between the processing component 302 and other components. For example, the processing component 302 may include a multimedia unit to facilitate interactions between the multimedia component 308 and the processing component 302.

The memory 304 is configured to store various types of data to support operations at the device 300. Examples of such data include instructions for any application or method operated on the device 300, contact data, phone book data, messages, images, videos and the like. The memory 304 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 306 provides power to various components of the device 300. The power component 306 may include a power management system, one or a plurality of power sources and other components associated with power generation, management, and distribution of the device 300.

The multimedia component 308 includes a screen that provides an output interface between the device 300 and the user. In some embodiments, the screen may include a liquid crystal display (LCD) and a touch panel (TP). In some embodiments, an organic light-emitting diode (OLED) display or other types of displays can be employed.

If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations. In some embodiments, the multimedia component 308 includes a front camera and/or a rear camera. When the device 300 is in an operation mode such as a shooting mode or a video mode, the front camera and/or the rear camera may receive external multimedia data. Each front camera and rear camera may be a fixed optical lens system or have a focal length and an optical zoom capability.

The audio component 310 is configured to output and/or input an audio signal. For example, the audio component 310 includes a microphone (MIC) that is configured to receive an external audio signal when the device 300 is in an operation mode such as a call mode, a recording mode, and a voice recognition mode. The received audio signal may be further stored in the memory 304 or transmitted via the communication component 316. In some embodiments, the audio component 310 further includes a speaker for outputting audio signals.

The I/O interface 312 provides an interface between the processing component 302 and a peripheral interface unit. The peripheral interface unit may be a keyboard, a click wheel, a button and so on. These buttons may include, but are not limited to, a home button, a volume button, a start button, and a locking button.

The sensor assembly 314 includes one or a plurality of sensors for providing the device 300 with various aspects of status assessments. For example, the sensor component 314 may detect an ON/OFF state of the device 300 and a relative positioning of the components. For example, the components may be a display and a keypad of the device 300. The sensor component 314 may also detect a change in position of the device 300 or a component of the device 300, the presence or absence of contact of the user with the device 300, the orientation or acceleration/deceleration of the device 300 and a temperature change of the device 300. The sensor component 314 may include a proximity sensor configured to detect the presence of nearby objects without any physical contact. The sensor component 314 may also include a light sensor (such as a CMOS or a CCD image sensor) for use in imaging applications. In some embodiments, the sensor component 314 may further include an acceleration sensor, a gyro sensor, a magnetic sensor, a pressure sensor, or a temperature sensor.

The communication component 316 is configured to facilitate wired or wireless communication between the device 300 and other devices. The device 300 may access a wireless network based on a communication standard such as Wi-Fi, 2G, 3G, 4G, 5G, or a combination thereof. In some embodiments, the communication component 316 receives broadcast signals or broadcast-associated information from an external broadcast management system via a broadcast channel. In some embodiments, the communication component 316 further includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology and other technologies.

In some embodiments, the device 300 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above shooting method.

In some embodiments, there is also provided a non-transitory computer readable storage medium including instructions, such as a memory 304 including instructions. The instructions are executable by the processor 320 of the device 300 to perform the above method. For example, the non-transitory computer readable storage medium may be a ROM, a random-access memory (RAM), a CD-ROM, a magnetic tape, a floppy disk, an optical data storage device, etc.

It should be understood that "a plurality of" referred to herein means two or more. The expression "and/or" describes the association relationship of the associated objects and expresses that three kinds of relationships may exist. For example, A and/or B may indicate that three cases where A exists independently, A and B exist at the same time, and B exists independently. The character "/" generally indicates that the associated objects before and after the character are in an "or" relationship. "A" and "the" representing singular forms are also intended to include plural forms, unless the context clearly indicates other meanings.

It can be further understood that terms "first," "second," and the like are used to describe various types of information, but the information should not be limited to these terms. These terms are only used to distinguish the same type of information from each other, and do not indicate a specific order or a degree of importance. In fact, expressions such as "first" and "second" can be used interchangeably. For example, without departing from the scope of the present disclosure, first information may also be referred to as second information, and similarly, the second information may also be referred to as the first information.

It can be further understood that although operations in embodiments of the present disclosure are described in a specific order in the accompanying drawings, it should not be understood that the operations are required to be performed in a specific order shown in the figures or in a serial order, or all the operations shown are required to be performed to get a desired result. In certain circumstances, multitasking and parallel processing may be advantageous.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

The various device components, modules, units, blocks, or portions may have modular configurations, or are composed of discrete components, but nonetheless can be referred to as "modules" in general. In other words, the "components," modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A background display method during a call, comprising:
    obtaining information on the call, the information comprising a call ringtone;
    determining a ringtone level of the call ringtone based on a peak-to-average ratio of a waveform calculated by an average value and a peak value of the waveform at different periods of the time from waveform data; and
    dynamically displaying a background image on a call interface based on the information, comprising: displaying a dynamically changing background image matching the ringtone level of the call ringtone on the call interface based on a correspondence between the ringtone level and a dynamically changing effect of the background image.

2. The method of claim 1, further comprising:
    in response to ringing of the call ringtone, monitoring the waveform data output from an audio interface through a broadcast receiver registered at an application layer; and
    determining the ringtone level of the call ringtone based on the peak-to-average ratio and a preset ringtone level threshold range.

3. The method of claim 1, wherein the information comprises a call duration; and
    dynamically displaying the background image on the call interface based on the information comprises:
        displaying a dynamically changing background image matching the call duration on the call interface based on a correspondence between the call duration and a dynamically changing effect of the background image.

4. The method of claim 3, wherein the displaying the dynamically changing background image matching the ringtone level of the call ringtone on the call interface comprises:
    determining vertex coordinates based on the background image;
    determining a plurality of fragment color values based on the ringtone level and/or the call duration, and the vertex coordinates; and
    invoking a rendering interface of an open graphics library, and transmitting the vertex coordinates and the plurality of fragment color values to the open graphics library, such that the open graphics library renders, based on the vertex coordinates and the plurality of fragment color values, the call background image to obtain a plurality of rendered frames of the background image, and the plurality of rendered frames of the background image form the dynamically changing background image.

5. A mobile terminal implementing the method of claim 1, comprising:
    a display screen configured to display the background image; and
    a broadcast receiver registered at an application layer and configured to monitor waveform data output from an audio interface in response to ringing of a call ringtone.

6. The mobile terminal of claim 5, wherein the mobile terminal is configured to:
    select a time interval as a cycle of obtaining the broadcast data sufficient for rendering of the dynamic image, to produce an effect that the background image changes dynamically with fluctuation of the broadcast data;
    determine the ringtone level of the call ringtone based on the peak-to-average ratio and a preset ringtone level threshold range;
    extracting a level of the waveform data from the ringtone data;
    set a correspondence between the ringtone level and the dynamically changing effect of the background image;
    dividing the background image into areas and determine vertexes of each of the areas as points in the area to calculate color values; and
    display the dynamically changing background image based on the calculated color values to generate an effect of a flow on the display screen.

7. A background display apparatus during a call, comprising:
    one or more processors;
    memory storing instructions executable by the one or more processors;
    wherein the one or more processors are configured to:
    obtain information on the call, the information comprising a call ringtone;
    determine a ringtone level of the call ringtone based on a peak-to-average ratio of a waveform calculated by an average value and a peak value of the waveform at different periods of time from waveform data; and
    dynamically display a background image on a call interface based on the information by: displaying a dynamically changing background image matching the ringtone level of the call ringtone on the call interface based on a correspondence between the ringtone level and a dynamically changing effect of the background image.

8. The apparatus of claim 7, wherein the one or more processors are further configured to:
    in response to ringing of the call ringtone, monitor the waveform data output from an audio interface through a broadcast receiver registered at an application layer; and
    determine the ringtone level of the call ringtone based on the peak-to-average ratio and a preset ringtone level threshold range.

9. The apparatus of claim 7, wherein the information comprises a call duration; and
    the one or more processors are configured to dynamically display the background image on the call interface based on the information by:
        displaying a dynamically changing background image matching the call duration on the call interface based on a correspondence between the call duration and a dynamically changing effect of the background image.

10. The apparatus of claim 9, wherein the displaying the dynamically changing background image matching the ringtone level of the call ringtone on the call interface comprises:
    determining vertex coordinates based on the background image;
    determining a plurality of fragment color values based on the ringtone level and/or the call duration, and the vertex coordinates; and invoking a rendering interface of an open graphics library, and transmitting the vertex coordinates and the plurality of fragment color values to the open graphics library, such that the open graphics library renders, based on the vertex coordinates and the plurality of fragment color values, the call background image to obtain a plurality of rendered frames of the background image, and the plurality of rendered frames of the background image form the dynamically changing background image.

11. A non-transitory computer-readable storage medium, wherein when an instruction in the storage medium is executed by a processor of a mobile terminal, the mobile terminal is configured to perform a background display method during a call, and the method comprises:
   obtaining information on the call, the information comprising a call ringtone;
   determining a ringtone level of the call ringtone based on a peak-to-average ratio of a waveform calculated by an average value and a peak value of the waveform at different periods of time from waveform data; and
   dynamically displaying a background image on a call interface based on the information, comprising: displaying a dynamically changing background image matching the ringtone level of the call ringtone on the call interface based on a correspondence between the ringtone level and a dynamically changing effect of the background image.

12. The non-transitory computer-readable storage medium of claim 11, wherein the method further comprises:
   in response to ringing of the call ringtone, monitoring the waveform data output from an audio interface through a broadcast receiver registered at an application layer; and
   determining the ringtone level of the call ringtone based on the peak-to-average ratio and a preset ringtone level threshold range.

13. The non-transitory computer-readable storage medium of claim 11, wherein the information comprises a call duration; and
   the dynamically displaying the background image on the call interface based on the information comprises:
      displaying a dynamically changing background image matching the call duration on the call interface based on a correspondence between the call duration and a dynamically changing effect of the background image.

14. The non-transitory computer-readable storage medium of claim 13, wherein the displaying the dynamically changing background image matching the ringtone level of the call ringtone on the call interface comprises:
   determining vertex coordinates based on the background image;
   determining a plurality of fragment color values based on the ringtone level and/or the call duration, and the vertex coordinates; and
   invoking a rendering interface of an open graphics library, and transmitting the vertex coordinates and the plurality of fragment color values to the open graphics library, such that the open graphics library renders, based on the vertex coordinates and the plurality of fragment color values, the call background image to obtain a plurality of rendered frames of the background image, and the plurality of rendered frames of the background image form the dynamically changing background image.

* * * * *